United States Patent
Lombardi et al.

(10) Patent No.: US 6,325,958 B1
(45) Date of Patent: Dec. 4, 2001

(54) METHOD FOR MANUFACTURE OF MANDRELS FOR SOLID FUEL ROCKET MOTORS AND OTHER APPLICATIONS

(75) Inventors: John Lang Lombardi; Gregory John Artz, both of Tucson, AZ (US)

(73) Assignee: Advanced Ceramics Research, Inc., Tucson, AZ (US)

( * ) Notice: Subject to any disclaimer, the term of this patent is extended or adjusted under 35 U.S.C. 154(b) by 0 days.

(21) Appl. No.: 09/567,817

(22) Filed: May 9, 2000

Related U.S. Application Data

(63) Continuation-in-part of application No. 09/439,385, filed on Nov. 15, 1999.

(51) Int. Cl.[7] .............................. B28B 1/26; B29C 33/38; B29C 41/16; B29C 70/30
(52) U.S. Cl. .............................. 264/86; 264/87; 264/137; 264/162; 264/135; 264/221; 264/258; 264/317; 156/173; 156/175; 524/493; 524/494; 524/549; 524/555; 524/808; 524/813; 523/218; 523/219
(58) Field of Search ................................ 523/218, 219; 524/494, 555, 813, 493, 591, 549, 808; 264/86, 87, 162, 279.1, 263, 137, 258, 221, 317, 135, 234, 345; 156/173, 175

(56) References Cited

U.S. PATENT DOCUMENTS

| | | | |
|---|---|---|---|
| 3,425,982 | * | 2/1969 | Fink ..................................... 524/413 |
| 3,960,816 | * | 6/1976 | Jurisch ................................. 523/143 |
| 4,000,682 | * | 1/1977 | Thibodaux, Jr. et al. .............. 86/1.1 |
| 4,436,867 | * | 3/1984 | Pomplun et al. ..................... 524/503 |
| 5,204,296 | * | 4/1993 | Walter et al. .......................... 501/97 |
| 5,277,863 | * | 1/1994 | Sayles ................................... 264/317 |
| 5,386,777 | | 2/1995 | Lou et al. ............................ 102/291 |
| 5,534,380 | * | 7/1996 | Bodager et al. ..................... 430/143 |
| 5,985,197 | * | 11/1999 | Nelson et al. ....................... 264/221 |
| 6,045,745 | * | 4/2000 | Reno ................................... 264/517 |

FOREIGN PATENT DOCUMENTS

| | | | | |
|---|---|---|---|---|
| 2331040-A | * | 5/1999 | (GB) | ............................ B29C/41/38 |
| 5208862-A | * | 8/1993 | (JP) | ............................ C04B/35/00 |
| 2000108210-A | * | 4/2000 | (JP) | ............................ B29C/70/06 |

OTHER PUBLICATIONS

Merck Index 12th Edition, Merck & Co., Whitehouse, N.J., pp. 1308–1309.
Polymer Chemistry Innovations, Technical Information: Ceramics Applications of Aquazol (2 sheets).
D. W. Van Krevelen, *Properties of Polymers 3rd Edition*, Elsevier Publishers, New York 1997, pp. 642.
Material Safety Data Sheet AQUAZOL 5/50/200/500, Polymer Chemistry Innovations, Inc., Tucson, Arizona, Feb. 27, 1998.

* cited by examiner

*Primary Examiner*—Jan H. Silbaugh
*Assistant Examiner*—Michael I. Poe
(74) *Attorney, Agent, or Firm*—Banner & Witcoff, Ltd.

(57) ABSTRACT

Cores for manufacture of molded products are fabricated from ceramic microspheres in combination with 5–20% polymer binder in water solution, the binder comprising poly(2-ethyl-2-oxazoline) and polyvinylpyrrolidone.

9 Claims, 4 Drawing Sheets

METHOD FOR MANUFACTURE OF MANDRELS FOR SOLID FUEL ROCKET MOTORS AND OTHER APPLICATIONS

RELATED APPLICATION

This is a continuation-in-part application of U.S. patent application Ser. No. 09/439,385 filed Nov. 15, 1999.

FIELD OF THE INVENTION

This invention relates to a method for manufacture of a mandrel or mold core and, more particularly, to a method for manufacture of mandrels used to fabricate rocket motors, housings and other uniquely shaped items made using a mandrel as a form or core.

BACKGROUND OF THE INVENTION

Mandrels have been used to fabricate rocket motor housings. For example, U.S. Pat. No. 5,386,777, which is incorporated by reference, describes fabrication of rocket motor housings using soluble mandrels that are composed of polyvinyl alcohol (PVA) sheets. According to U.S. Pat. No. 5,386,777, a mandrel may be formed by wrapping a core or tube with a web or sheets of highly porous polyvinyl alcohol, then coating the formed mandrel with insulation and an epoxy impregnated fiber filament that is cured, typically by heat, to form the housing over the PVA mandrel or core.

There are certain disadvantages to the fabrication methodology taught in U.S. Pat. No. 5,386,777. That is, the polyvinyl alcohol web has limited thermal stability and decomposes at elevated temperatures. More specifically, polyvinyl alcohol undergoes significant thermal decomposition in air at temperatures between about 200–220 degrees C. See D. W. Van Krevelen, Properties of Polymers 3rd Edition, Elsevier Publishers, New York, 1997, page 642; Merck Index 12th Edition, Merck & Co., Whitehouse, N.J., page 1309. Polyvinyl alcohol also has a high viscosity. A material having a lower viscosity than polyvinyl alcohol at equal solute concentrations is desirable. Polyvinyl alcohol also has a significant creep upon heating. A material having less creep is desirable.

Polyvinyl alcohol also has a tendency to be chemically reactive since it has reactive functional groups pendant to its backbone (e.g., hydroxyl groups). A material that is more chemically inert than polyvinyl alcohol is desirable. These limitations make it difficult to fabricate rocket housings and nozzles from epoxy or thermosetting resin that requires high curing temperatures. Thus, a more suitable method for manufacture of a mandrel is desired.

SUMMARY OF THE INVENTION

Briefly, the present invention comprises a method for manufacture of a mandrel or other shaped core item which may be used as a mold form and which further has utility as a carrier by virtue of the porosity of the mold form. Specifically, and by way of example, hollow ceramic microspheres are mixed together with a water soluble organic binder to form a billet. The billet is then dried by heating to form a generally solid material wherein the water is removed from the material. The binder is typically poly(-2-ethyl-2-oxazoline) and derivatives thereof. In preferred embodiments the amount of binder in the mixture is in the range of up to 50% by weight of the mixture forming the billet. The dried billet may then be machined into a mold form or core. In the event the mold form is used for manufacture of a rocket motor or casing, the mold form is then wrapped with an epoxy impregnated fiber filament known in the composites fabrication trade as a prepreg. The prepreg is then permitted to cure, often at elevated temperatures. The motor may then be transported to a launch or assembly site at which time the core which was formed from the mixture of binder and microsphere material is filled with a liquid oxidizer. Alternatively, the core (mandrel) being water soluble is washed from the housing before the housing is loaded with rocket fuel.

Thus, it is an object of the invention to provide a mandrel or mold core which may be formed as a billet, dried and machined to provide a complex core shape.

It is a further object of the invention to provide a mold core which has high thermal stability, does not decompose, and which may be manufactured inexpensively.

Yet a further object of the invention is to provide a mold core material which may be easily fabricated into a billet and then machined using existing machining technology.

These and other objects, advantages, and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
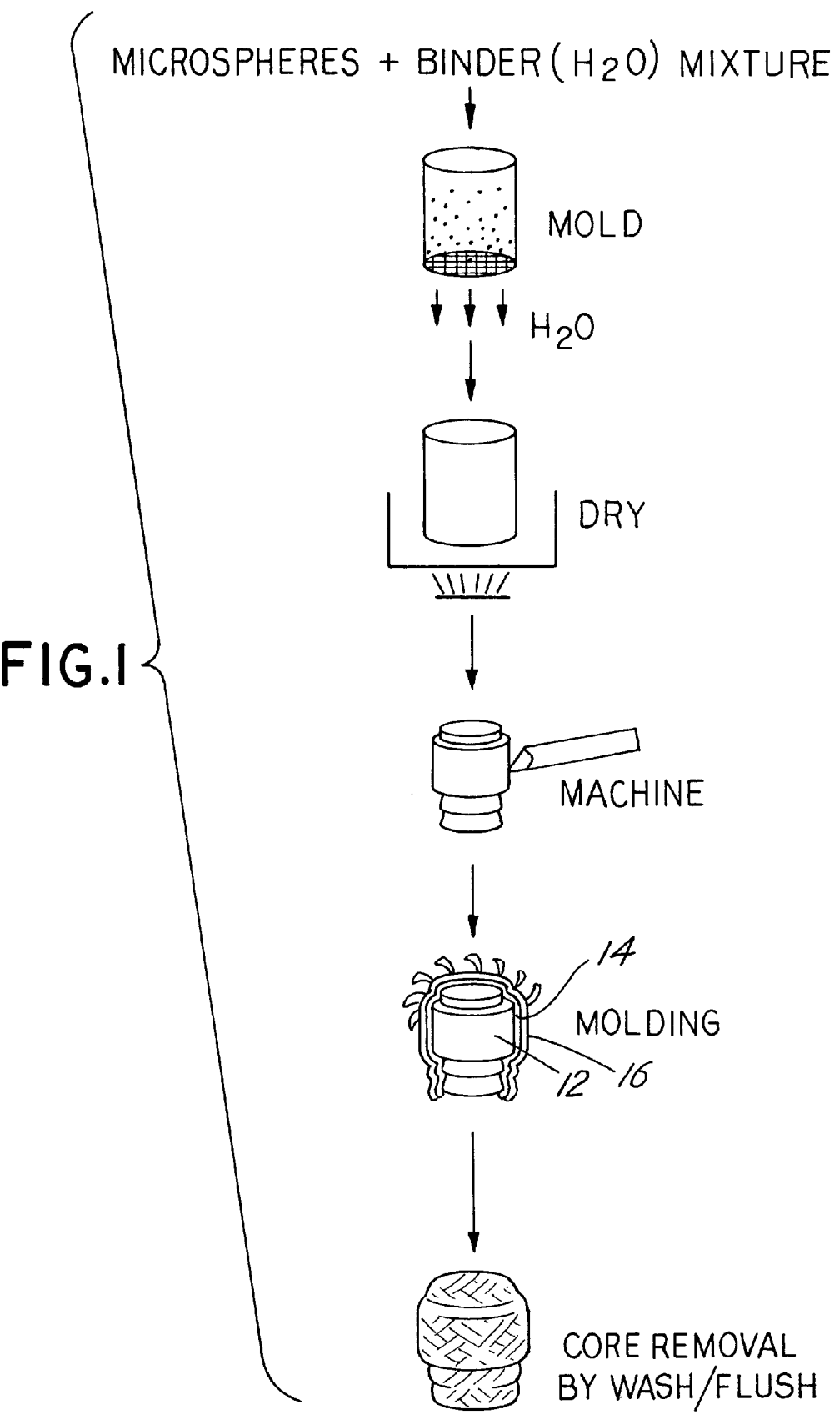
FIG. 1 is a schematic flow chart illustrating the steps in the manufacture of a rocket motor housing including the steps for manufacture of a mold core for the rocket motor housing.
Figure 2:
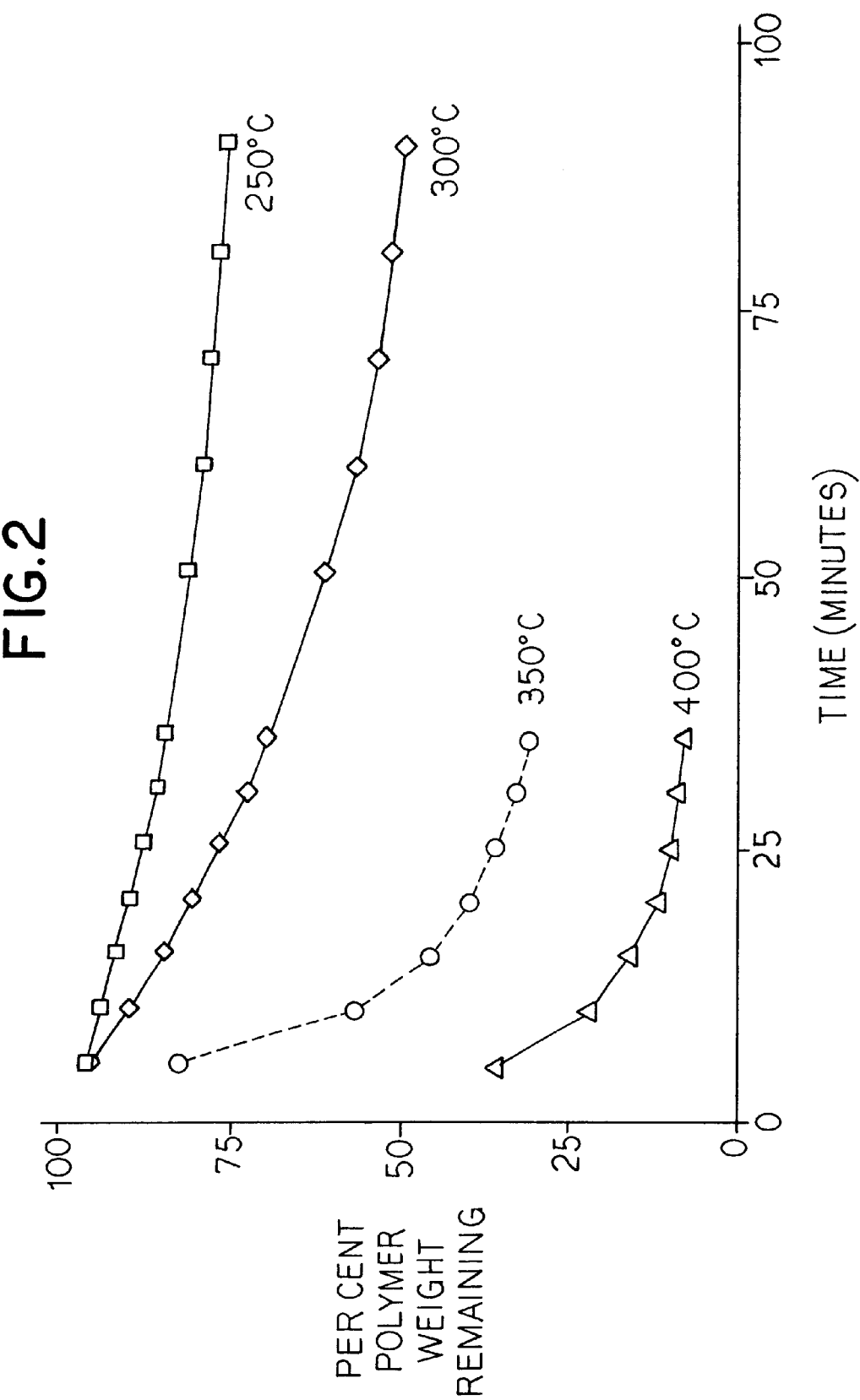
FIG. 2 is a graph illustrating a preferred binder material utilized in the manufacture of a mold material the effect of pyrolysis or heating.

To practice the invention requires execution of a series of sequential steps set forth schematically in FIG. 1. Referring to FIG. 1, therefore, the first step is to provide a mixture or slurry comprised of microspheres of any one of a number of solid materials and a binder. For example, the microspheres may be organic solids, metal, ceramic, or mixtures thereof Thus, solid polymeric microspheres may be utilized, though ceramics are preferred as are metals. The microspheres are intended to be small particles. They may be hollow or solid. Hollow spheres are preferred. They will typically have a size in the range of 10 to 200 microns, although materials outside this range may possibly be used in the practice of the invention. In experiments conducted, a type of microsphere that has been found useful comprises hollow ceramic spheres obtained from PQ Corporation, Chattanooga, Tenn., having 120 micrometer mean sphere diameter and identified by the tradename SLG Grade Extendospheres.

The second material which is added to the mixture is a polymeric binder. The polymeric binder is preferably soluble in water. Preferred polymeric binders comprise poly(2-ethyl-2-oxazoline), derivatives of poly(2-ethyl-2-oxazoline) and mixtures thereof. A preferred material which has been used in test environments is sold under the trade name Aquazol, by Polymer Chemistry Innovations, Inc., Tucson, Ariz. Such materials have average molecular weights ranging from 50,000–500,000 "Daltons".

The described materials, namely the microspheres and the binder, are mixed in solution in water. The binder has the characteristic of dynamic wetting of the spheres. The mixture is placed into a mold form so that it may be cast as a billet. The mold form typically includes means for de-watering, for example by draining. That is, the mold may have a cylindrical shape with a screen along the bottom end thereof. De-watering is then effected by draining water through the screen, either by means of gravity, or a partial vacuum may be provided to effect de-watering.

In the next step, typically, the molded billet is removed from the mold and subjected to a drying operation. In the mixing and subsequent drying operation, the binder material as described adsorbs onto the microspheres. It is noted that the microspheres are typically unaltered chemically, but are bound together by the binder. The amount of binder utilized in such a mixture is in the range of 5–50% by weight with preferred ranges being in the amount of 5–20% by weight and a preferred embodiment having 10% by weight polymer binder.

In some circumstances depending upon the polymer and the microsphere being utilized, it may be desirable to pyrolyze the formed billet or partially pyrolyze the formed billet. This is not a preferred approach, however.

Subsequently, the billet is machined into a form, such as the form of a core for a solid fuel rocket engine. The machining may be accomplished typically by means of a lathe or milling machine using carbide tooling, typically at slow cutting speeds.

The result of the process steps described comprises the formation of a core which may then be used in a molding operation. Such a core is a substitute for sand and/or salt cores used typically in prior art molding operations. The use of sand and/or salt cores results in a core construction which is highly corrosive or difficult to work with or has other undesirable attributes. With the core construction of the present invention, it is possible to avoid these problems associated with the prior art.

In any event, the core may then be used for manufacture of a molded product. For example, in the circumstance of forming a solid fuel rocket engine casing, the molded core 12 in FIG. 1 may have an optional coating or insulation 14 applied to the outside surface thereof Thereafter, a ribbon of fiber material epoxy coating may be wound on the core 12 to assume the shape of the core 12 to form a housing 16. Subsequently, the molded epoxy coating housing 16 is cured, for example, by subjection to heat or light. It is noted that with the subject matter core 12 of the invention as described, it is possible to heat the epoxy coating up to temperatures of approximately at least 300 degrees without serious degradation of the core 12 as observed in the prior art.

Thereafter, the core 12 itself may be removed by flushing the core 12 with water which breaks down the core materials into the component parts of the mixture, namely the hollow microspheres and the binder, which is water soluble. The core 12 may thus be removed from the molded housing 16. The housing 16 may then be filled with solid rocket fuel propellant.

Figure 3:
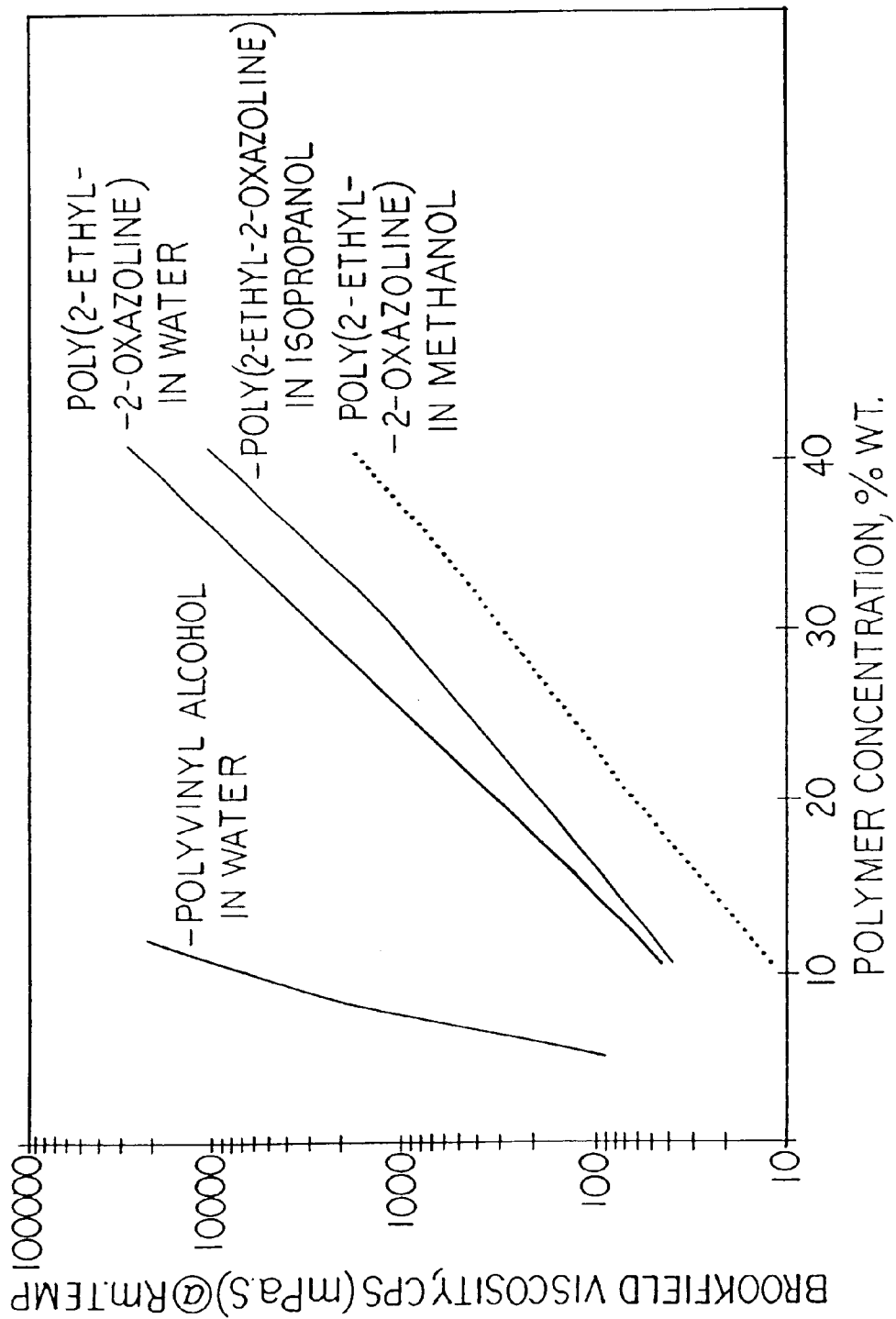
FIG. 3 is a graph illustrating the solution viscosity of a preferred binder material.

There are numerous advantages with respect to the construction as described. For example, first of all, the mixed materials are safe and easy to use because the binder is water soluble. Next, as shown in FIG. 3, the binder material has a very low aqueous solution viscosity enabling ease of use relative to the prior art combinations and minimal use of solvent/binder.

Additional advantages result from the choice of binder and microspheres in combination, including the following benefits. The binder has a higher thermal stability than prior art materials. That is, it does not undergo significant thermal decomposition in air at temperatures below 350° C. The material has excellent dynamic wetting characteristics and does not creep upon heating. The binder is more chemically inert than prior art materials, nonetheless when water flows around the microspheres, the water soluble polymer adheres to those spheres and joins them together in a highly efficient manner which may later be reversed by adding water and dissolving away the core as described.

Following is an example of the practice of the invention.

EXAMPLE 1

Figure 4:
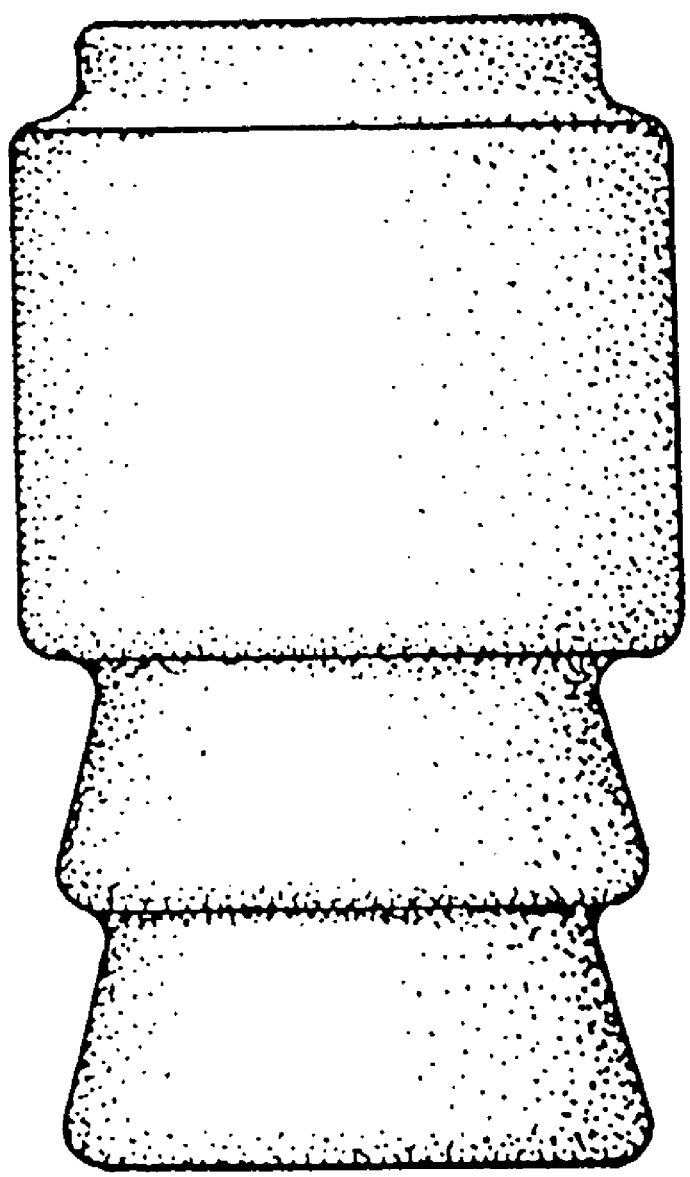
FIG. 4 is a plan view of a typical machined billet utilized as a mandrel or core for forming a motor casing or housing for a rocket.

SLG grade extendospheres obtained from PQ Corporation were admixed with a 10% by weight aqueous solution of Aquazol brand poly(2-ethyl-2-oxazoline) having an average mocular weight of 200,000 and obtained from Polymer Chemistry Innovations, Inc. The combination was mixed and placed in a glass beaker having a wire mesh bottom. Excess aqueous solution was allowed to filter through the wire screen or mesh leaving a moist compact that was then dried at 100° C. overnight. The resulting composite billet was then removed from the beaker and machined on a lathe using carbide tooling at slow cutting speeds. FIG. 4 illustrates a mandrel specimen machined from such a billet. The mandrel or core was then available for further processing including heat curing of a coated epoxy mold material at temperatures up to 400° F. without adverse incident.

As previously discussed, a soluble mandrel formulation for manufacturing composite rocket engine casings has been developed. The mandrel formulation is based upon a paste composed of ceramic microspheres, water, and poly-2-ethyl-oxazoline (PEOx) polymer. A mandrel is made by shaping the paste into the desired geometry followed by drying and finish machining (if necessary).

The thermomechanical properties of mandrels may be limited since the material begins to soften at temperatures about 250 degrees F. Therefore, composite parts made upon these mandrels must be cured at temperatures below 250 degrees F to prevent slumping.

A second generation mandrel formulation has been formulated having a similar composition to the previous one except polyvinylpyrrolidone (PVP) has been also added to the paste formulation. A significant advantage of this mandrel material is that it is able to withstand higher baking temperatures and does not slump even when heated to temperatures above 420 degrees F. The table below sets forth a preferred embodiment of the mandrel paste of the present invention.

| Ingredient | Concentration (Wt. %) | Acceptable Range (Wt. %) |
| --- | --- | --- |
| PVP | 1.8 | 1.0–3.0 |
| PEOx | 1.8 | 1.0–5.0 |
| Water | 31.5 | 15.0–50.0 |
| Ceramic Microspheres (PQ Corp. Extendospheres SLG Grade) | 64.9 | 30.0–80.0 |

PVP is a water soluble, linear polymer having a higher glass transition temperature compared to PEOx (approx. 190 degrees C vs. 65 degrees C, respectively). The addition of PVP to the PEOx mandrel component may enable a blend to form having a higher glass transition temperature (Tg) than the pure PEOx component The higher Tg of the blend therefore increases the resistance of the dried mandrel towards slumping at temperatures above 400 degrees F. This is beneficial since it enables the mandrel formula to be used for curing a wider range of epoxy prepreg materials which may require higher curing temperatures than 250 degrees F.

It is contemplated that other materials may be substituted for the binder and for the microspheres. It is further contemplated that the microspheres may be hollow, spherical or have other shapes. Thus, the invention is to limited only by the following claims and equivalents thereof.

We claim:

1. A method for manufacture of a mold core comprising, in combination, the steps of:
    (a) formulating a mix consisting essentially of
        (i) a matrix material selected from the group consisting of ceramic microbeads, metal microbeads, polymeric microbeads and mixtures thereof,
        (ii) a polymer binder selected from the group consisting of poly(2-ethyl-2-oxazoline), derivatives of poly(2-ethyl-2-oxazoline) and mixtures thereof with water, and
        (iii) a polymer binder selected from the group consisting of polyvinylpyrrolidone, derivatives of polyvinylpyrrolidone and mixtures hereof with water;
    (b) casting the mixture in a mold form to mold a billet;
    (c) dewatering the billet by draining water from the mold;
    (d) drying the billet to remove residual water; and
    (e) machining the billet to a desired shape.

2. The method of claim 1 including the further step of molding a rocket engine housing on the mold core.

3. The method of claim 2 including the further step of impregnating the mold core with a liquid oxidizer.

4. The method of claim 1 including the further step of molding an item on the core.

5. The method of claim 4 wherein the molding step includes placement of mold material on the core.

6. The method of claim 4 including the further step of removing the core by dissolution in a solvent.

7. The method of claim 6 wherein the solvent is, at least in part, water.

8. The method of claim 4 wherein the molding step includes coating the core with a protective layer and subsequent placement of a mold material on the coated core.

9. The method of claim 8 including the further step of curing the mold material.

* * * * *